United States Patent [19]

Miyashita et al.

[11] Patent Number: 5,241,943
[45] Date of Patent: Sep. 7, 1993

[54] AIR-FUEL RATIO CONTROL METHOD FOR INTERNAL COMBUSTION ENGINES

[75] Inventors: Yukio Miyashita; Hironao Fukuchi; Kunio Noguchi, all of Wako, Japan

[73] Assignee: Honda Giken Kogyo Kabushiki Kaisha, Tokyo, Japan

[21] Appl. No.: 935,316

[22] Filed: Aug. 26, 1992

[30] Foreign Application Priority Data

Aug. 30, 1991 [JP] Japan ................... 3-245224

[51] Int. Cl.$^5$ .................. F02D 41/04; F02M 25/07
[52] U.S. Cl. .................. 123/679; 123/698; 123/571
[58] Field of Search ............... 123/679, 681, 687, 698, 123/571

[56] References Cited

U.S. PATENT DOCUMENTS

| | | | |
|---|---|---|---|
| 4,378,776 | 4/1983 | Nishimori | 123/571 |
| 4,448,178 | 5/1984 | Yamato et al. | 123/571 X |
| 4,665,882 | 5/1987 | Otobe | 123/571 |
| 5,113,835 | 5/1992 | Seki et al. | 123/571 |

FOREIGN PATENT DOCUMENTS

| | | |
|---|---|---|
| 55-123345 | 9/1980 | Japan. |
| 62-203951 | 9/1987 | Japan. |
| 63-16577 | 4/1988 | Japan. |

*Primary Examiner*—Willis R. Wolfe
*Attorney, Agent, or Firm*—Nikaido, Marmelstein, Murray & Oram

[57] ABSTRACT

According to an air-fuel ratio control method, an amount of fuel supplied to an internal combustion engine is calculated by the use of an air-fuel ratio correction coefficient set according to an output from an exhaust gas ingredient concentration sensor. An average value of the air-fuel ratio correction coefficient is calculated. When a difference between an actual value of opening of an exhaust gas recirculation control valve and a desired value of same set in response to operating conditions of the engine is larger than a predetermined value, the calculation of the average value of the air-fuel ratio correction coefficient is inhibited, or alternatively, an averaging rate in the calculation of the average value is decreased.

8 Claims, 9 Drawing Sheets

AIR-FUEL RATIO CONTROL METHOD FOR INTERNAL COMBUSTION ENGINES

BACKGROUND OF THE INVENTION

1. Field of the Invention

This invention relates to an air-fuel ratio control method for internal combustion engines, and more particularly to an air-fuel ratio control method for feedback-controlling the air-fuel ratio of an air-fuel mixture supplied to an internal combustion engine by the use of an exhaust gas ingredient concentration sensor.

2. Prior Art

Conventionally, as an air-fuel ratio control method for an internal combustion engine having an exhaust passage, an intake passage, an exhaust gas recirculation passage connecting between the exhaust passage and the intake passage, an exhaust gas recirculation control valve arranged across the exhaust gas recirculation passage, and an exhaust gas ingredient concentration sensor arranged in the exhaust passage, there has been proposed e.g. by Japanese Patent Publication (Kokoku) No. 63-16577, in which an amount of fuel supplied to the engine is calculated by the use of an air-fuel ratio correction coefficient set in dependence on an output from the exhaust gas ingredient concentration sensor, to thereby feedback-control the air-fuel ratio to a desired air-fuel ratio in response to operating conditions of the engine, and an average value of the air-fuel ratio correction coefficient is calculated. The average value of the air-fuel ratio correction coefficient is used as an initial value thereof when the feedback control of the air-fuel ratio is resumed, or it is used in place of the air-fuel ratio correction coefficient when the feedback control is interrupted, or the air-fuel ratio correction coefficient and the average value thereof are both used, to calculate an amount of fuel supplied to the engine.

Further, an air-fuel ratio control method has been recently proposed, in which an exhaust gas ingredient concentration sensor having an output characteristic which is approximately proportional to the concentration of an exhaust gas ingredient is used in feedback-controlling the air-fuel ratio of an air-fuel mixture supplied to the engine (hereinafter referred to as "the supply air-fuel ratio") to a desired air-fuel ratio set in response to operating conditions of the engine. For example, a method of this kind has been proposed by Japanese Provisional Patent Publication (Kokai) No. 62-203951, in which an air-fuel ratio correction coefficient is calculated based on an output from an exhaust gas ingredient concentration sensor of the above-mentioned type and a desired air-fuel ratio, and the difference between an actual value of the correction coefficient and a reference value thereof is calculated as a learned value in each of steady and transient operating conditions of the engine, the learned value being used in controlling the supply air-fuel ratio.

On the other hand, an exhaust gas recirculation control method for an internal combustion engine has been proposed e.g. by Japanese Provisional Patent Publication (Kokai) No. 55-123345, in which an actual value of the opening of an exhaust gas recirculation control valve arranged across an exhaust gas recirculation passage connecting between the exhaust passage and the intake passage is detected, while a desired value of the opening of the exhaust gas recirculation control valve is set in response to operating conditions of the engine detected, and there is calculated the difference between the actual value and the desired value of the opening of the exhaust gas recirculation control valve, to thereby control the exhaust gas recirculation control valve in such a manner that the difference becomes equal to zero.

However, when this exhaust gas recirculation control method is used in combination with the above described air-fuel ratio control method in an internal combustion engine, the calculation of the average value of the air-fuel ratio correction coefficient suffers from the following problems:

In carrying out the air-fuel ratio feedback control, particularly the air-fuel ratio feedback control over a wide operating condition range of the engine by the use of the above-mentioned exhaust ingredient concentration sensor having the proportional output characteristic, it is necessary to calculate an average value (i.e. learned value) of the air-fuel ratio correction coefficient even in an exhaust gas recirculation control region in order to secure a wider learning range of the operating conditions of the engine. However, a basic fuel amount to be corrected by the air-fuel ratio correction coefficient when the exhaust gas recirculation is performed is set to a value suitable for an engine operating condition in which the desired value of the opening of the recirculation control valve and the actual value of same are equal to each other. Therefore, when the actual value is largely different from the desired value, the actual amount of exhaust gas recirculated is deviated from a desired value, and hence the supply air-fuel ratio is deviated from a proper value. As a result, the air-fuel ratio correction coefficient set in response to the output from the exhaust gas ingredient concentration sensor assumes a value much deviated from a proper value, which make it impossible to obtain an accurate learned value of the air-fuel ratio correction coefficient. If such an inaccurate learned value is used, the supply air-fuel ratio cannot be controlled properly. In this connection, the actual value of the opening of the exhaust gas recirculation control valve is largely different from the desired value, e.g. when the lift operation of the valve is delayed relative to a change in the engine operating condition because the engine is in a transient operating condition, such as an accelerating condition, or when the opening of the valve, which operates in response to the intake pipe negative pressure of the engine, becomes inaccurate due to lowered atmospheric pressure at high altitudes.

SUMMARY OF THE INVENTION

It is an object of the invention to provide an air-fuel ratio control method for an internal combustion engine which is adapted to calculate a learned value of an air-fuel ratio correction coefficient only when the engine is in an exhaust gas recirculatin control condition suitable for calculation thereof to prevent the learned value from being deviated from a proper value, to thereby effect proper control of the air-fuel ratio.

To attain the above object, according to a first aspect of the invention, there is provided an air-fuel ratio control method for an internal combustion engine including an intake passage, an exhaust passage, an exhaust gas recirculation passage connecting between the intake passage and the exhaust passage, and exhaust gas recirculation control valve means arranged across the exhaust gas recirculation passage, and exhaust gas ingredient concentration sensor means arranged in the exhaust passage, wherein an amount of fuel supplied to the engine is calculated by the use of an air-fuel ratio correction coefficient set according to an output from the exhaust gas ingredient concentration sensor means, to thereby feedback-control the air-fuel ratio of an air-fuel mixture to a desired value in response to operating conditions of the engine, and an average value of the air-fuel ratio correction coefficient is calculated.

The air-fuel ratio control method according to the first aspect of the invention is characterized by comprising:

detecting an actual value of opening of the exhaust gas recirculation control valve means;

setting a desired value of the opening of the exhaust gas recirculation control valve means in response to operating conditions of the engine;

comparing the actual value of the opening of the exhaust gas recirculation control valve means with the desired value of the opening of the exhaust gas recirculation control valve means; and inhibiting the calculation of the average value of the air-fuel ratio correction coefficient when a difference between the actual value of the opening of the exhaust gas recirculation control valve means and the desired valve of the opening of the exhaust gas recirculation control valve means is larger than a predetermined value.

According to a second aspect of the invention, there is provided an air-fuel ratio control method of the above-mentioned type, which is characterised by comprising:

detecting an actual value of opening of the exhaust gas recirculation control valve means;

setting a desired value of the opening of the exhaust gas recirculation control valve means in response to operating conditions of the engine;

comparing the actual value of the opening of the exhaust gas recirculation control valve means with the desired value of the opening of the exhaust gas recirculation control valve means; and decreasing an averaging rate in the calculation of the average value of the air-fuel ratio correction coefficient when a difference between the actual value of the opening of the exhaust gas recirculation control valve means and the desired value of the opening of the exhaust gas recirculation control valve means is larger than a predetermined value.

Preferably, the exhaust gas ingredient concentration sensor means has an output characteristic which is approximately proportional to concentration of an ingredient of exhaust gases in the exhaust passage.

More preferably, the average value of the air-fuel ration correction coefficient is used as an initial value of the air-fuel ratio correction coefficient when the feedback control of the air-fuel ratio is started.

Also preferably, the average value of the air-fuel ratio correction coefficient is used as an air-fuel ratio correction coefficient when the feedback control of the air-fuel ratio is inhibited.

In another preferred embodiment of the inveiton, the amount of fuel supplied to the engine is calculated by the use of the air-fuel ratio correction coefficient and the average value of the air-fuel ratio correction coefficient.

Preferably, the calculation of the average value of the air-fuel ratio correction coefficient by using a normal averaging rate is started when a predetermined time period has elapsed after the difference between the actual value of the opening of the exhaust gas recirculation control valve means and the desired value of the opening of the exhaust gas recirculation control valve means has ceased to be larger than the predetermined value.

Also preferably, the engine includes intake valves and exhaust valves, and a valve timing changeover mechanism for changing at least one of a valve-opening time period, valve-opening timing, and a valve lift of the intake valves or the exhaust valves, and the average value of the air-fuel ratio correction coefficient is separately calculated according to each of changeover modes of the valve timing changeover mechanism.

The above and other objects, features, and advantages of the invention will be more apparent from the detailed description taken in conjunction with the accompanying drawings.

DETAILED DESCRIPTION

The method according to the invention will now be described in detail with reference to the drawings showing an embodiment thereof.

Figure 1:
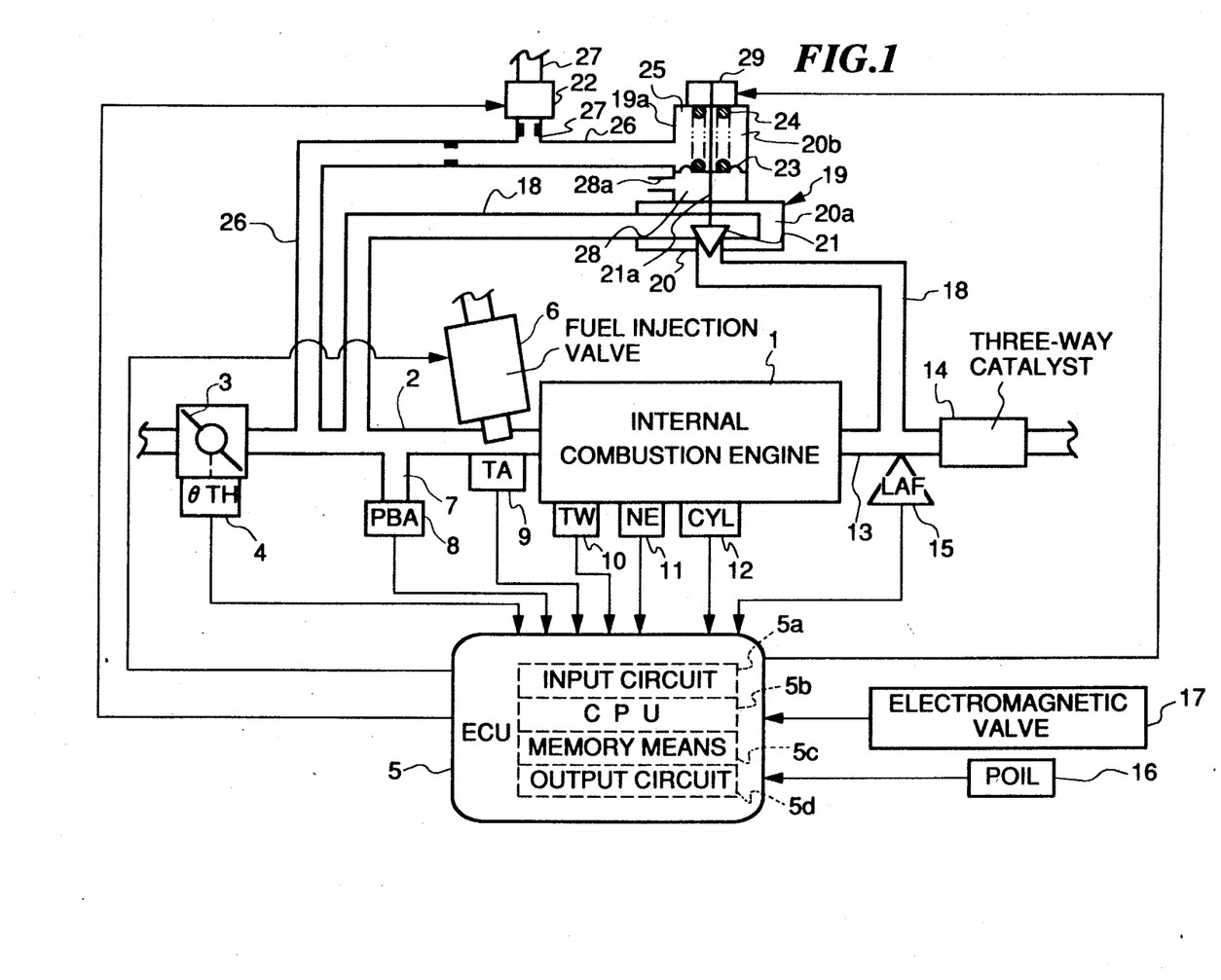
FIG. 1 is a block diagram of the whole arrangement of a fuel supply control system for an internal combustion engine, to which the method according to the invention is applied.

Referring first to FIG. 1, there is shown the whole arrangement of a fuel supply control system which is adapted to carry out the method of this invention. In the figure, reference numeral 1 designates a DOHC straight type four cylinder internal combustion engine, each cylinder being provided with a pair of intake valves and a pair of exhaust valves, not shown. This engine 1 is arranged such that the operating characteristics of the intake valves and exhaust valves (more specifically, the valve opening period and the lift (generically referred to hereinafter as "valve timing") permit selection between a high speed valve timing adapted to a high engine speed region and a low speed valve timing adapted to a low engine speed region.

In an intake pipe 2 of the engine 1, there is arranged a throttle body (not shown) accommodating a throttle valve 3 therein. A throttle valve opening (θTH) sensor 4 is connected to the throttle valve 3 for generating an electric signal indicative of the sensed throttle valve opening and supplying same to an electronic control unit (hereinafter referred to as "the ECU") 5.

Fuel injection valves 6 are each provided for each cylinder and arranged in the intake pipe 2 between the engine 1 and the throttle valve 3, and at a location slightly upstream of the intake valves. The fuel injection valves 6 are connected to a fuel pump, not shown, and electrically connected to the ECU 5 to have their valve opening periods controlled by signals therefrom.

An electromagnetic valve 17 is connected to the output side of the ECU 5 to selectively control the aforementioned valve timing, the opening and closing of this electromagnetic valve 17 being controlled by the ECU 5. The valve 17 selects either high or low hydraulic pressure applied to a valve timing selection mechanism, not shown. Corresponding to this high or low hydraulic pressure, the valve timing is thereby adjusted to either a high speed valve timing or a low speed valve timing. The hydraulic pressure applied to this selection mechanism is detected by a hydraulic pressure (oil pressure) (POIL) sensor 16 which supplies a signal indicative of the sensed hydraulic pressure to the ECU 5.

Further, an intake pipe absolute pressure (PBA) sensor 8 is provided in communication with the interior of the intake pipe 2 via a conduit 7 at a location immediately downstream of the throttle valve 3' for supplying an electric signal indicative of the sensed absolute pressure to the ECU 5. An intake temperature (TA) sensor 9 is inserted into the intake pipe 2 at a location downstream of the intake pipe absolute pressure sensor 8 for supplying an electric signal indicative of the sensed intake temperature TA to the ECU 5.

An engine coolant temperature (TW) sensor 10, which may be formed of a thermistor or the like, is mounted in the cylinder block of the engine 1 for supplying an electric signal indicative of the sensed engine coolant temperature TW to the ECU 5. An engine rotational speed (NE) sensor 11 and a cylinder-discriminating (CYL) sensor 12 are arranged in facing relation to a camshaft or a crankshaft of the engine 1, neither of which is shown. The engine rotational speed sensor 11 generates a pulse as a TDC signal pulse at each of predetermined crank angles whenever the crankshaft rotates through 180 degrees, while the cylinder-discriminating sensor 12 generates a pulse at a predetermined crank angle of a particular cylinder of the engine, both of the pulses being supplied to the ECU 5.

A three-way catalyst 14 is arranged within an exhaust pipe 13 connected to the cylinder block of the engine 1 for purifying noxious components such as HC, CO and NOx. An O2 sensor 15 as an exhaust gas ingredient concentration sensor (referred to hereinafter as an "LAF sensor") is mounted in the exhaust pipe 13 at a location upstream of the three-way catalyst 14, for supplying an electric signal having a level approximately proportional to the oxygen concentration in the exhaust gases to the ECU 5.

Details of the construction of the LAF sensor 15 are disclosed in U.S. Ser. No. 07/796,415 assigned to the present assignee.

An exhaust gas recirculation passage 18 is provided, which extends between the intake pipe 2 and the exhaust pipe 13 in a manner bypassing the engine 1. The exhaust gas recirculation passage 18 has one end thereof opening into the exhaust passage 13 at a location upstream of the LAF sensor 15, i.e. on the side thereof closer to the engine 1, and the other end opening into the intake passage 2 at a location upstream of the PBA sensor 8, i.e. on the side thereof closer to the throttle valve 3.

An exhaust gas recirculation control valve (hereinafter referred to as "the EGR valve") 19 is arranged across an intermediate portion of the exhaust gas recirculation passage 18. The EGR valve 19 is formed of a so-called diaphragm valve operated by valve operating means 19a of differential pressure-responsive type. The EGR valve 19 comprises a casing 20 having a valve chamber 20a and a diaphragm chamber 20b defined therein, a valve element 21 arranged within the valve chamber 20a of the casing 20 for movement to close and open the exhaust gas recirculation passage 18, a diaphragm 23 connected to the valve element 21 via a valve stem 21a and operated in response to the resultant pressure of the pressure PBA within the intake pipe and atmospheric pressure PA, which resultant pressure is controlled by a resultant pressure control valve 22 described in detail hereinbelow, and a spring 24 urging the diaphragm 23 in a valve-closing direction. A negative pressure communication passage 26 has one end thereof connected to a negative pressure chamber 25 defined by the diaphragm 23 on an upper side thereof as viewed in FIG. 1, and the other end thereof connected to the interior of the intake pipe 2 at a location between the throttle valve 3 and the other end of the exhaust gas recirculation passage 18, whereby the pressure PBA within the intake pipe 2 is supplied to the negative pressure chamber 25 via the negative pressure communication passage 26. An atmosphere communication passage 27 is connected to an intermediate portion of the negative pressure communication passage 26, and the resultant pressure control valve 22 is arranged across the atmosphere communication passage 27. The operation of the resultant pressure control valve 22, which is formed of a normally-open electromagnetic valve, is controlled by a duty ratio of a command signal from the ECU 5 to thereby control the resultant pressure introduced into the negative pressure chamber 25 of the diaphragm chamber 20b. The resultant pressure control valve 22 is electrically connected to the ECU 5, to be controlled by the command signal from the ECU 5, whereby the lift amount or lifting speed of the valve element 21 of the EGR valve 19 is controlled. An atmospheric pressure chamber 28 is defined by the diaphragm 23 on a lower side thereof and communicates with the atmosphere via a hole 28a.

A valve opening (lift) sensor (hereinafter referred to as "the L sensor") 29 is provided for the EGR valve 19, which detects an operating position (lift amount) of the valve element 21 of the EGR valve 19 and supplies a signal indicative of the detected lift amount of the valve element 21.

If the resultant pressure control valve 22 is energized to be closed by a driving signal from the ECU 5, the negative pressure within the negative pressure chamber 25 increases, i.e. the force biasing the diaphragm 23 in a valve-opening direction (i.e. upward as viewed in FIG. 1) increases, so that the diaphragm 23 moves upward against the urging force of the spring 24 to thereby increase the valve opening defined by the valve element 21 of the EGR valve 19. On the other hand, if the control valve 22 is deenergized to be opened, the negative pressure within the negative pressure chamber 25 decreases, i.e. the force biasing the diaphragm 23 in the valve-opening direction decreases, so that the diaphragm 23 moves downward by the urging force of the spring 24 to thereby displace the valve element 21 of the EGR valve 19 to a lower position to decrease the valve opening defined by the valve element 21. In this way, the valve opening of the EGR valve 19 can be controlled by energizing or deenergizing the resultant pressure control valve 22.

The ECU 5 comprises an input circuit 5a having the functions of shaping the waveforms of input signals from various sensors, shifting the voltage levels of sensor output signals to a predetermined level, converting analog signals from analog-output sensors to digital signals, and so forth, a central processing unit (hereinafter referred to as "the CPU") 5b, memory means 5c storing various operational programs which are executed in the CPU 5b and for storing results of calculations therefrom, etc., and an output circuit 5d which outputs driving signals to the fuel injection valves 6, the electromagnetic valve 17 and the resultant pressure control valve 22.

The CPU 5b operates in response to the above-mentioned signals from the sensors to determine operating conditions in which the engine 1 is operating such as an air-fuel ratio feedback control region and open-loop control regions, and calculates, based upon the determined operating conditions, the valve opening period or fuel injection period TOUT over which the fuel injection valves 6 are to be opened by the use of the following equation (1) in synchronism with inputting of TDC signal pulses to the ECU 5:

$$TOUT = Ti \times KCMDM \times KLAF \times K1 + K2 \qquad (1)$$

where Ti represents a basic fuel amount, more specifically a basic fuel injection period which is determined according to the engine rotational speed Ne and the intake pipe absolute pressure PBA. The value of Ti is determined by a Ti map stored in the memory means 5c. The Ti map is comprised of two types, one of which is to be used when the EGR operation is performed, and the other when the EGR operation is inhibited, respectively.

KCMDM is a modified desired air-fuel ratio coefficient which is set according to engine operating conditions, and calculated by multiplying a desired air-fuel ratio coefficient KCMD representing a desired air-fuel ratio by a fuel cooling correction coefficient KETV. The correction coefficient KETV is intended to apply a prior correction to the fuel injection amount in view of the fact that the supply air-fuel ratio varies due to the cooling effect produced when fuel is actually injected, and its value is set according to the value of the desired air-fuel ratio coefficient KCMD. Further, as will be clear from the aforementioned equation (1), the fuel injection period TOUT increases if the desired fuel-air injection ratio coefficient KCMD increases, so that the values of KCMD and KCMDM will be in direct proportion to the reciprocal of the air-fuel ratio A/F.

KLAF is an air-fuel ratio correction coefficient which is set such that the air-fuel ratio detected by the LAF sensor 15 during air-fuel ratio feedback control coincides with the desired air-fuel ratio, and is set to predetermined values or average values (learned values) thereof depending on engine operating conditions during open-loop control.

K1 and K2 are other correction coefficients and correction variables, respectively, which are calculated based on various engine parameter signals to such values as to optimize characteristics of the engine such as fuel consumption and accelerability depending on engine operating conditions.

The CPU 5b outputs a valve timing selection command signal depending on engine operating conditions, which causes opening and closing of the electromagnetic valve 17.

The CPU 5b determines whether or not the output signal from the L sensor 29 assumes an abnormal value, and determines operating conditions of the engine 1 based on various detection signals from the above-mentioned sensors to calculate and set a desired valve opening value LCMD of the EGR valve 19 according to the results of the determination.

The desired opening value LCMD can be calculated and set in various manners. For example, a value thereof corresponding to operating parameters of the engine 1, e.g. the engine rotational speed and the intake pipe absolute pressure PBA is selected from a plurality of values thereof set and stored beforehand corresponding to the operating parameters of the engine 1.

The desired valve opening value LCMD thus set is compared with the actual value opening value LACT of the EGR valve 19 detected by the L sensor 29, and the resultant pressure control valve 22 is operated to control the lifting operation of the EGR valve 19 such that the absolute value of the difference between the two values becomes equal to zero, whereby the opening of the EGR valve 19 is controlled to a value which achieves an amount of exhaust gas recirculated suitable for the operating condition of the engine.

The CPU 5b supplies driving signals based on results of the above-described calculations and determinations via the output circuit 5d to the fuel injection valves 6, the electromagnetic valve 17, and the resultant pressure control valve 22 for driving them.

Figure 2:
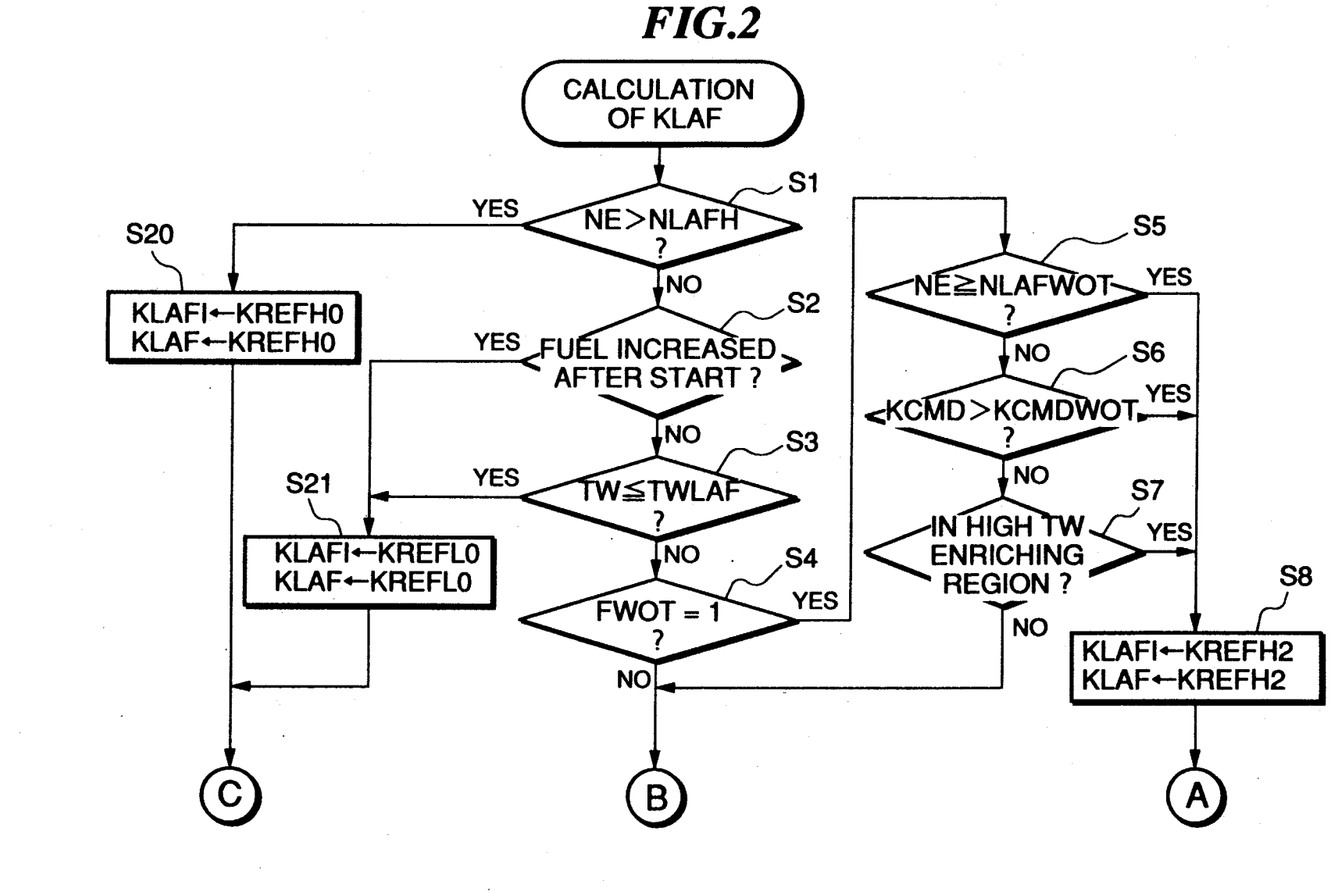
FIG. 2 is a flowchart of a program for calculating an air-fuel ratio correction coefficient (KLAF)
Figure 3:
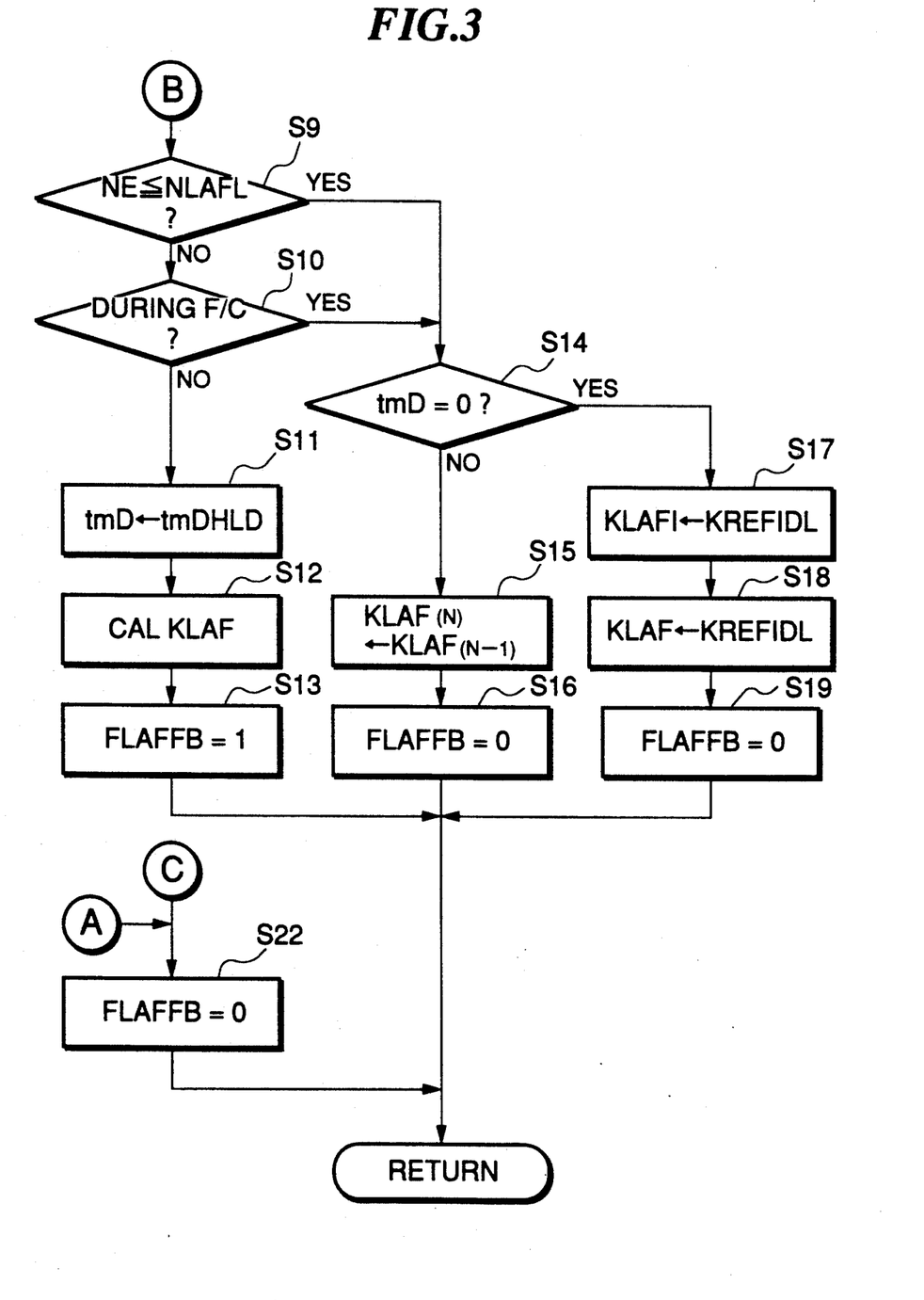
FIG. 3 is a continuation of the flowchart of the program for calculating the air-fuel ratio correction coefficient (KLAF)

FIGS. 2 and 3 show a program for calculating the air-fuel ratio correction coefficient KLAF. This program is executed in synchronism with each TDC signal pulse whenever it is generated.

At a step S1, it is determined whether the engine rotational speed NE is higher than a predetermined upper limit NLAFH (e.g. 6,500 rpm). If the answer is affirmative (YES), i.e. if NE>NLAFH, an integral term KLAFI used for calculation of the air-fuel ratio correction coefficient KLAF applied during air-fuel ratio feedback control by a program in FIGS. 4 and 5, hereinafter described, and the correction coefficient KLAF are both set to a first high speed valve timing learned value KREFHO, at a step S20, and a flag FLAFFB, which is set to 1 during air-fuel ratio feedback control, is set to 0 at a step S22, followed by termination of the present program. The learned value KREFHO is a learned value of the air-fuel ratio correction coefficient which is calculated when the desired air-fuel ratio is equal to the stoichiometric air-fuel ratio or in the vicinity thereof in high speed valve timing-selected mode by a program in FIGS. 6, 7, and 8, hereinafter described.

If the answer to the question of the step S1 is negative (NO), i.e. if NE≦NLAFH, it is determined whether increase of the fuel amount (fuel increase) is being carried out after the start of the engine, at a step S2. If the answer is negative (NO), it is determined whether the engine coolant temperature TW is equal to or lower than a predetermined value TWLAF (e.g. −25° C.), at a step S3. If the step S2 or S3 provides an affirmative answer (YES), the values KLAFI and KLAF are both set to a first low valve timing learned value KREFLO, at a step S21, and then the program proceeds to a step S22. The learned value KREFLO is a learned value of the air-fuel ratio correction coefficient calculated when the desired air-fuel ratio is equal to the stoichiometric air-fuel ratio or in the vicinity thereof in low value timing-selected mode, by the program of FIGS. 6, 7, and 8.

If the answer to the question of the step S3 is negative (NO), i.e. if TW>TWLAF, it is determined whether a flag FWOT, which is set to a value of 1 while the engine is in a predetermined high load operating condition, has the value of 1, at a step S4. If the answer is negative (NO), i.e. if FWOT=0 and accordingly the engine is not in the predetermined high load operating condition, the program jumps to a step S9, whereas if the answer is affirmative (YES), i.e. if FWOT=1, it is determined whether the engine rotational speed NE is higher than a predetermined value NLAFWOT (e.g. 5,000 rpm). If the answer to the step S5 is negative (NO), i.e. if NF<NLAFWOT, it is determined whether the desired air-fuel ratio coefficient KCMD is larger than a predetermined value KCMDWOT (e.g. a value corresponding to A/F=12.5), at a step S6. If the answer is negative (NO), i.e. if KCMD≦KCMDWOT, it is determined whether the engine is in a high coolant temperature and enriching region where fuel increase should be effected, at a step S7.

If any of the steps S5–S7 provides an affirmative answer (YES), i.e. if NE≧NLAFWOT or KCMD>KCMDWOT, or the engine is in the high coolant temperature and enriching region, the values KLAFI and KLAF are both set to KREFH2 at a step S8, and then the program proceeds to the step S22. If all the steps S5–S7 provide negative answers (NO), it is determined whether the engine rotational speed NE is equal to or lower than a predetermined lower limit NLAFL (e.g. 400 rpm), at a step S9. If the answer is negative (NO), i.e. if NE>NLAFL, fuel cut (cutting-off of supply of fuel to the engine) is being carried out, at a step S10.

If either the step S9 or the step S10 provides an affirmative answer (YES), i.e. if NE≦NLAFL, or if fuel cut being carried out, it is determined whether a count value tmD in a KLAF holding timer which is set to a predetermined time period tmDHLD (e.g. 1 sec) during air-fuel ratio feedback control at a step S11, is a value of 0, at a step S14. If the answer is negative (NO), i.e. if tmD>0, that is, if the predetermined time period tmDHLD has not yet elapsed after the air-fuel ratio feedback control was interrupted, a value $KLAF_{(N)}$ of the air-fuel ratio correction coefficient in the present loop is set to a value $KLAF_{(N-1)}$ assumed in the last loop, at a step S15, and the flag FLAFFB is set to 0 at a step S16, followed by terminating the program. If the answer to the question of the step S14 is affirmative (YES), i.e. if tmD=0, that is, if the predetermined time period tmDHLD has elapsed, the values KLAFI and KLAF are both set to an idling learned value KREFIDL which is calculated while the engine is idling, by the FIGS. 6, 7, and 8 program, at steps S17 and S18, and the flag FLAFFB is set to 0, followed by terminating the program.

If the answers to the questions of the steps S9, S10 are both negative (NO), it is judged that the engine is in an operating region in which the air-fuel ratio feedback control can be effected (hereinafter referred to as "the feedback control region"), and then the KLAF holding timer tmD is set to the predetermined time period tmDHLD and started, at a step S11. Further, the KLAF value is calculated by the program of FIGS. 4 and 5 at a step S12, and the flag FLAFFB is set to 1 at a step S13, followed by terminating the program.

Figure 4:
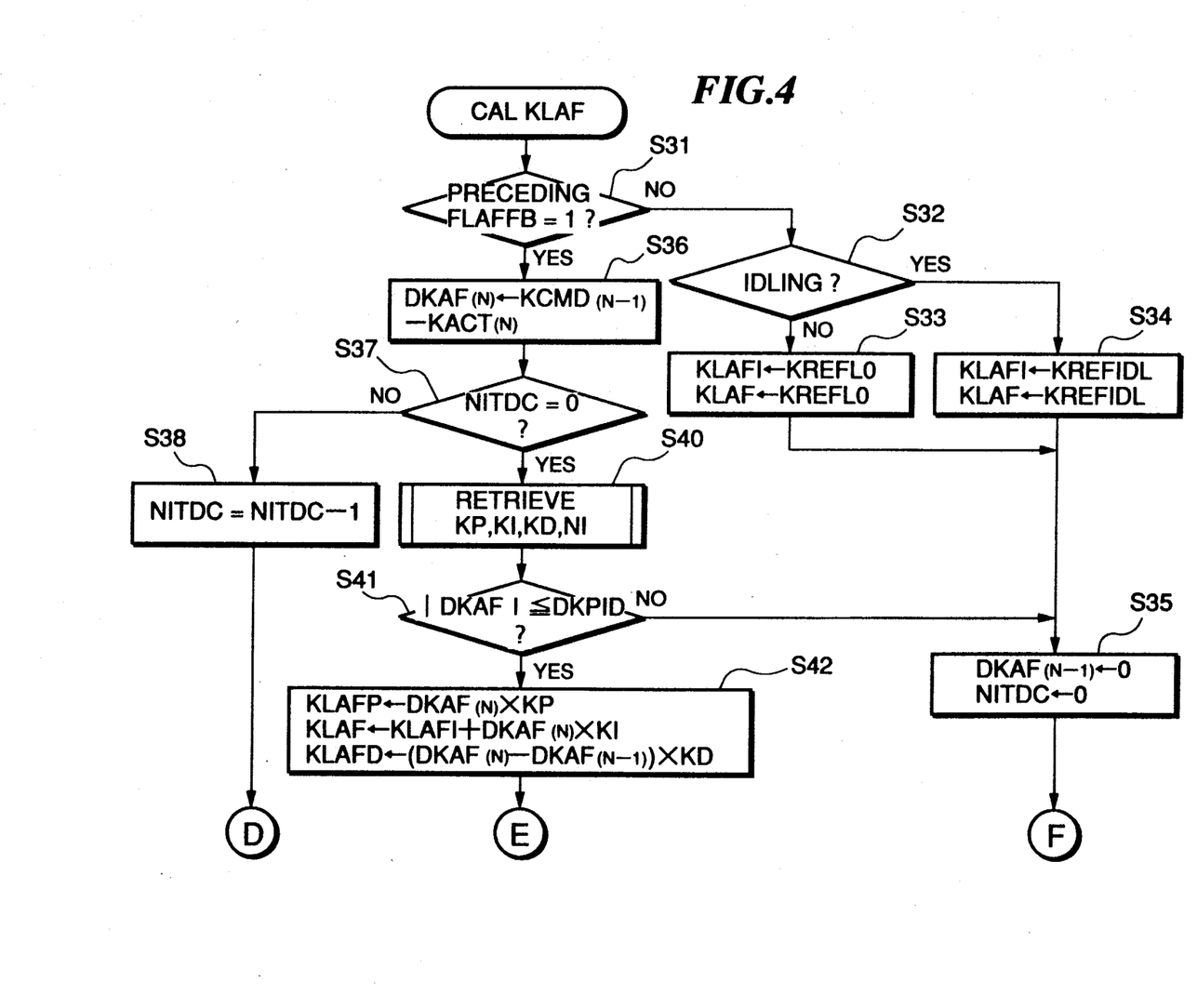
FIG. 4 is a flowchart of a program for calculating the air-fuel ratio correction coefficient based on the output from an exhaust gas ingredient concentration sensor (LAF sensor)
Figure 5:
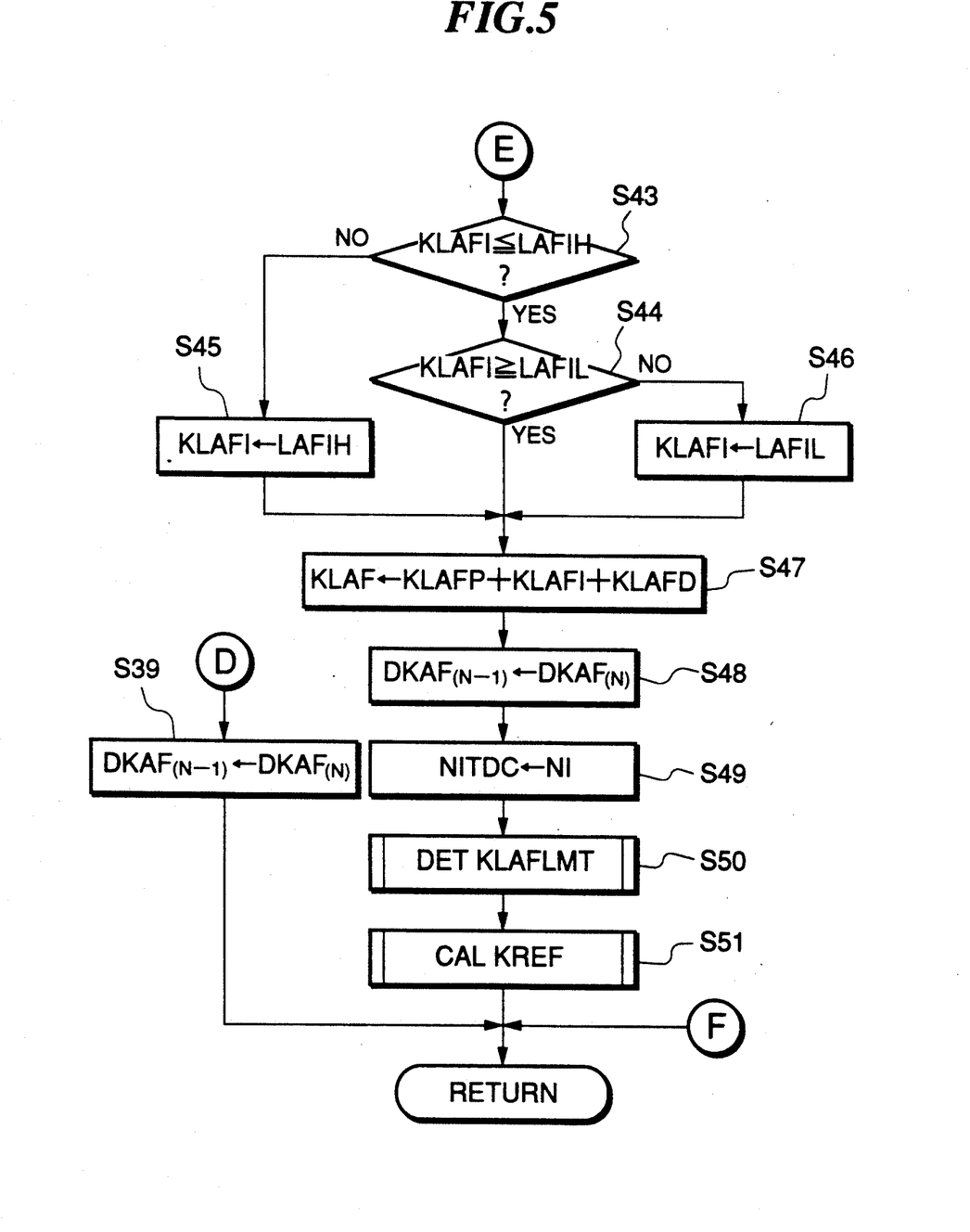
FIG. 5 is a continuation of the flowchart of the program for calculating the air-fuel ratio correction coefficient based on the output from then exhaust gas ingredient concentration sensor (LAF sensor)

FIGS. 4 and 5 show details of the program for calculating the air-fuel ratio correction coefficient KLAF which is executed at the step S12 in FIG. 3.

Figure 10:
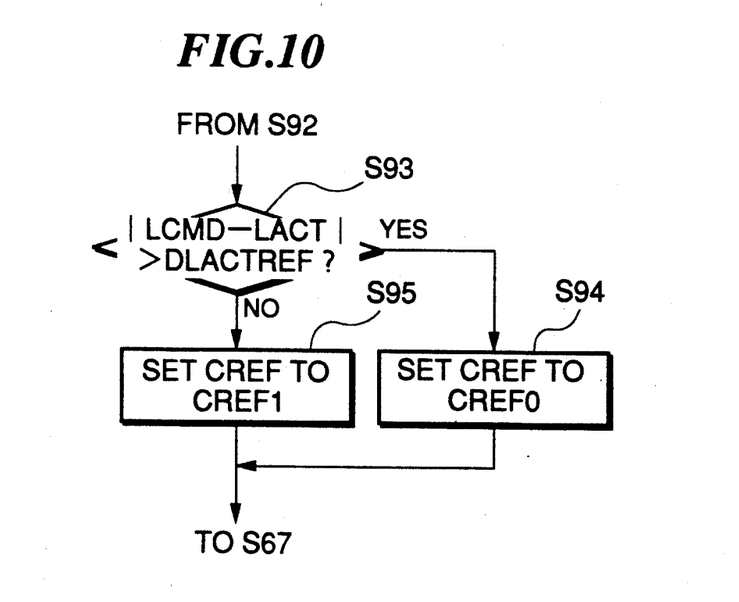
FIG. 10 is part of a flowchart of a program, which is a modification of the program of FIGS. 6 to 8.

At a step S31 in FIG. 10, it is determined whether the flag FLAFFB assumed 1 at the time of generation of the immediately preceding TDC pulse (i.e. in the last loop of execution of the program of FIGS. 2 and 3). If the answer is negative (NO), i.e. if the engine was not in the feedback control region and has first entered the same region in the present loop, the program proceeds to a step S32 where it is determined whether the engine is idling. If the answer to the step S32 is affirmative (YES), the values KLAFI and KLAF are both set to the idling learned value KREFIDL, at a step S34, and then the program proceeds to a step S35, whereas if the answer to the step S32 is negative (NO), the values KLAFI and KLAF are both set to the first low speed valve timing learned value KREFL0, at a step S33, followed by the program proceeding to the step S35.

At the step S35 an immediately preceding value DKAF(N−1) of the difference between the desired air-fuel ratio coefficient KCMD and the equivalent ratio (hereinafter referred to as "the detected air-fuel ratio") indicative of an air-fuel ratio detected by the LAF sensor 15 is set to a value of 0, and a thinning-out TDC variable NITDC is set to a value of 0, followed by terminating the program. The thinning-out TDC variable NITDC is used to renew the air-fuel ratio correction coefficient KLAF whenever TDC signal pulses equal in number to a thinning-out number NI are generated. If the answer to the question of a step S37, hereinafter referred to, is affirmative (YES), i.e. if NITDC=0, the program proceeds to a step S40, where renewal of the KLAF value is carried out.

If the answer to the question of the step S31 is affirmative (YES), i.e. if FLAFFB=1, which means that the engine was also in the feedback control region in the last loop, the difference DKAF(N) between the detected air-fuel ratio and the desired air-fuel ratio is calculated by subtracting a present value KACT(N) of the detected air-fuel ratio from an immediately preceding value KCMD(N−1) of the desired air-fuel ratio coefficient, at a step S36. Then, at a step S37, it is determined whether the thinning-out TDC variable NITDC has a value of 0.

If the answer is negative (NO), i.e. if NITDC>0, the value NITDC is decreased by a decrement of 1 at a step S38, and the present value DKAF(N) of the above difference is set to the immediately preceding value DKAF(N−1) at a step S39, followed by terminating the program.

If the answer to the question of the step S37 is affirmative (YES), calculations are made of a proportional term (P term) coefficient KP, an integral term (I term) coefficient KI, a differential term (D term) coefficient KD, and the thinning-out number NI, at a step S40. The values KP, KI, KD and NI are set to respective predetermined values in each of a plurality of engine operating regions defined by engine rotational speed NE, intake pipe absolute pressure PBA, etc. Therefore, values of KP, KI, KD and NI are read out which correspond to detected engine operating regions.

At a step S41, it is determined whether the absolute value of the difference DKAF calculated at the step S36 is smaller than a predetermined value DKPID. If the answer is negative (NO), i.e. if |DKAF|>DKPID, the program proceeds to the step S35, whereas if the answer is affirmative (YES), i.e. if |DKAF|≦DKPID, the program proceeds to a step S42. At the step S42, the P term KLAFP, I term KLAFI and D term KLAFD are calculated by the following equations (2)–(4):

$$KLAFP = DKAF(N) \times KP \quad (2)$$

$$KLAFI = KLAFI + DKAF(N) \times KI \quad (5)$$

$$KLAFD = (DKAF(N) - DKAF(N-1)) \times KD \quad (6).$$

At the following steps S43–S46, limit checking of the I term KLAFI calculated above is effected. Specifically, the calculated value KLAFI is compared with predetermined upper and lower limits LAFIH and LAFIL at the steps S43, S44. If the value KLAFI exceeds the upper limit LAFIH, the former is set to the latter (step S45), and if the value KLAFI falls below the lower limit LAFIL, the former is set to the latter (step S46).

At the following step S47, the PID terms KLAFP, KLAFI, and KLAFD calculated as above are added together to calculate the air-fuel ratio correction coefficient KLAF. Then, the present value DKAF(N) of the difference calculated above is set to the immediately preceding value DKAF(N−1) at a step S48, and further the thinning-out TDC variable NITDC is set to the thinning-out number NI calculated at the step S10, at a step S49, followed by the program proceeding to steps S50 and S51.

Figure 6:
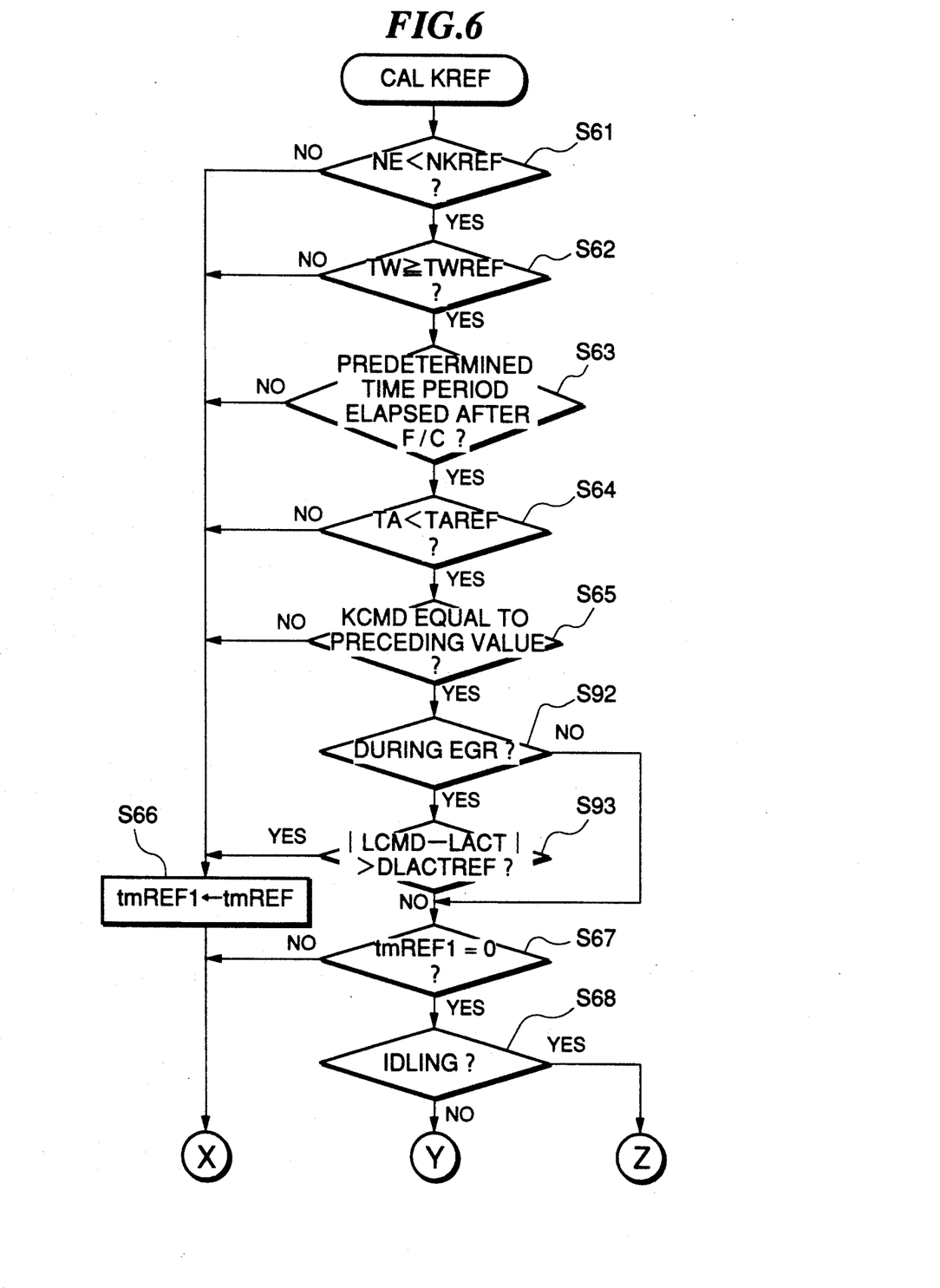
FIG. 6 is a flowchart of a program for caluclating an average value (KREF) of the air-fuel ratio correction coefficient.
Figure 7:
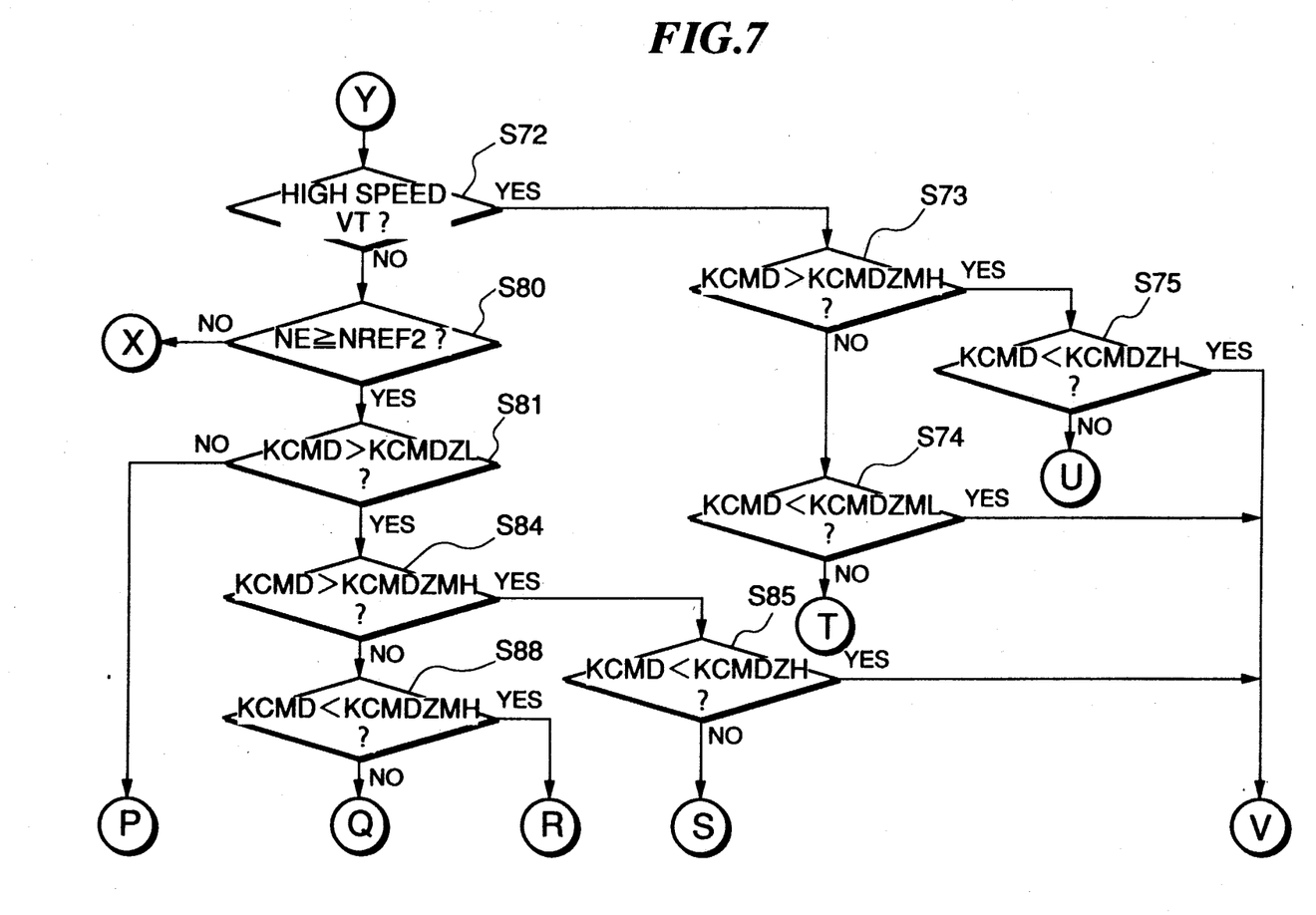
FIG. 7 is a continuation of the flowchart of the program for caluclating the average value (KREF) of the air-fuel ratio correction coefficient.
Figure 8:
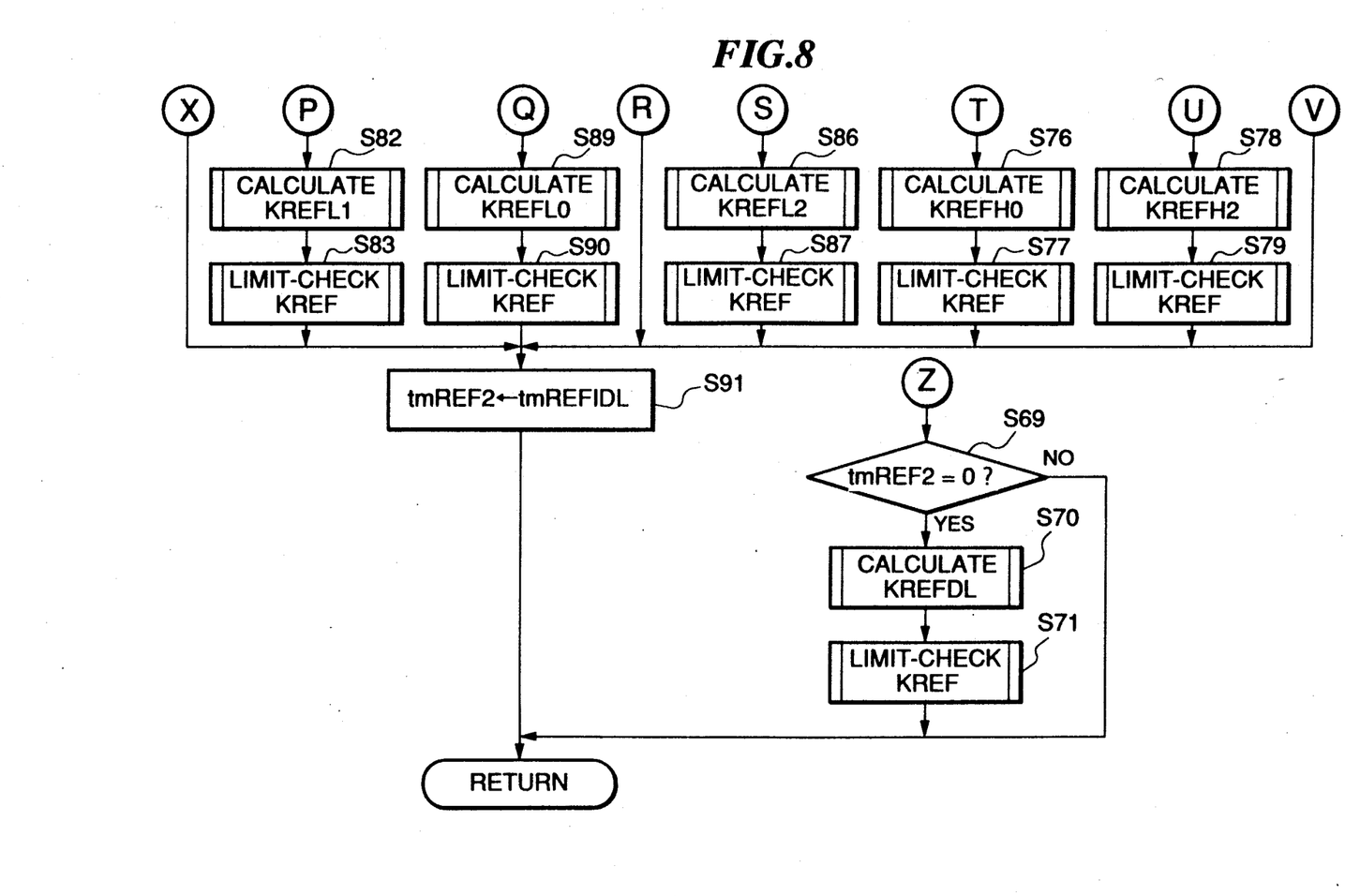
FIG. 8 is a further continuation of the flowchart of the program for calculating the average value (KREF) of the air-fuel ratio correction coefficient.

At the step S50, limit checking of the KLAF value is effected, and at the step S51, calculation of the learned value KREF of the air-fuel ratio correction coefficient is carried out by the program of FIGS. 6, 7, and 8, followed by terminating the program.

Next, the manner of calculating the average value KREF of the air-fuel ratio correction coefficient KLAF will be described with reference to FIGS. 6, 7, and 8.

First, at steps S61–S65, S92 and S93 in FIG. 6, determinations are made as to whether or not conditions for calculation of the learned value (hereinafter referred to as "the learned value calculating conditions") are satisfied. More specifically, it is determined whether the engine rotational speed NE is lower than a predetermined high rotational speed NKREF (e.g. 6,000 rpm), at a step S61, whether the engine coolant temperature TW is equal to or higher than a predetermined value TWREF (e.g. 75° C.) at a step S62, whether a predetermined time period has elapsed after termination of fuel cut at a step S63, whether the intake temperature TA is lower than a predetermined value TAREF (e.g. 60° C.) at a step S64, and whether the present value of the desired air-fuel ratio coefficient KCMD is equal to the immediately preceding value at a step S65. Further, it is determined at a step S92 whether the exhaust gas recirculation control (EGR) is being performed, and if the answer to this question is affirmative (YES), it is determined at a step S93 whether or not the absolute value of the difference between the desired valve opening value LCMD and the actual valve opening value LACT of the EGR valve 19 is larger than a predetermined value DLACTREF. If the answer of any of the steps S61–S65 is negative (NO), or if the answer to the question of the step S92 is affirmative (YES) and at the same time the answer to the question of the step S93 is affirmative (YES), it is judged that the learned value calculating conditions are not satisfied, and then a timer tmREF1, which counts time elapsed after fulfillment of the learned value calculating conditions, is set to a predetermined time period tmREF (e.g. 1.5 sec) and started at a step S66, and then the program proceeds to a step S91.

The determination of the step S62 is provided for the following reason: When the engine coolant temperature is low, fuel injected into the intake pipe is drawn into the combustion chamber without being fully atomized, so that a misfire can occur or the engine rotation can become unstable. As a result, accurate detection of the air-fuel ratio cannot be effected by the LAF sensor 15.

The determination of the step S64 is provided for the following reason: When the intake temperature is high, the charging efficiency of the engine lowers so that the supply air-fuel ratio is deviated to a richer value with respect to a desired value.

Therefore, by inhibiting the calculation of the learned value at a low engine coolant temperature as well as at a high intake temperature, it can be prevented that the detected air-fuel ratio varies with a change in the engine temperature, leading to a deviation in the learned value calculated.

The determinations of the steps S92 and S93 are provided for the following reason: When the EGR is being performed, the aforementioned Ti map for use during the EGR is selected for determining the basic fuel amount Ti. The Ti values in this map are set such that they are suitable to operating conditions of the engine on the assumption that the actual amount of exhaust gases recirculated is equal to a desired value (i.e. LACT=LCMD). If the actual valve opening value LACT is largely deviated from the desired valve opening value LCMD, due to delayed lifting of the EGR valve 19 relative to a change in the engine operating condition and a lift error thereof due to a change in the intake pipe absolute pressure PBA, e.g. when the engine is in a transient operating condition, such as an accelerating condition, or when the vehicle is travelling at a high altitude, the actual amount of exhaust gas recirculated is deviated from a desired value, and hence the supply air-fuel ratio is deviated from a proper value. As a result, the air-fuel ratio correction coefficient KLAF set in response to the output from the LAF sensor 15 assumes a value much deviated from a proper value, i.e. a value reflecting the deviated supply air-fuel ratio. Therefore, according to the invention, by inhibiting the calculation of the average value KREF of the correction coefficient KLAF when the difference between the desired valve opening value LCMD and the actual valve opening value LACT is large, to thereby enable to prevent deviation of the supply air-fuel ratio caused by an improper amount of exhaust gases recirculated and hence deviation of the learned value of the air-fuel ratio correction coefficient.

On the other hand, if all the answers to the questions of the steps S61–S65 are affirmative (YES), and at the same time the answer to the question of the step S93 is negative (NO) when the EGR is being performed (i.e.

the answer to the question of the step S92 is affirmative), it is judged that the learned value calculating conditions are satisfied, and then the program proceeds to a step S67. Further, if the answer to the question of the step S92 is negative (NO), i.e. if the EGR is not being performed, the program proceeds to the step S67 as well. At the step S67, it is determined whether the count value of the timer tmREF1 is equal to 0. If the answer is negative (NO), i.e. if tmREF1>0, that is, if the predetermined time period tmREF has not yet elapsed after fulfillment of the learned value calculating conditions, the program jumps to the step S91, without executing calculation of the learned value. Thereafter, when the answer to the step S67 becomes affirmative (YES), i.e. when the predetermined time period tmREF has elapsed, the steps S68 et seg. are executed to carry out calculation of the learned value in response to operating conditions of the engine.

The reason why the calculation of the learned value is inhibited until the predetermined time period tmREF elapses even after fulfillment of the learned value calculating condition is as follows: There is a time lag between the time a mixture is supplied into the intake system and the time the resulting air-fuel ratio caused by burning of the supplied mixture is detected in the exhaust system. As a result, in the case where the desired air-fuel ratio is changed from 16 to 22, for example, if the learned value is calculated immediately upon such change, the air-fuel ratio corresponding to the desired air-fuel ratio set to 16 is detected in the exhaust system, and accordingly the learned value is calculated as a learned value corresponding to the desired air-fuel ratio set to 22 by using KLAF values calculated based upon the above detected air-fuel ratio. Consequently, the calculated learned value corresponding to the desired air-fuel ratio set to 22 assumes a learner or smaller value than the proper value. Particularly, if the desired air-fuel ratio is set to a value learner than the stoichiometric air-fuel ratio, the learned value is deviated to a further learner value, which can result in a misfire if the deviated learned value is applied.

Therefore, according to this embodiment, even when the condition that the desired air-fuel ratio coefficient KCMD has the same value as one applied in the last loop is satisfied, calculation of the learned value is inhibited over the predetermined time period tmREF, to thereby avoid the above-mentioned inconvenience.

At the step S68, it is determined whether the engine is idling. This determination is carried out based upon detected values of engine rotational speed WE, intake pipe absolute pressure PBA and throttle value opening θTH, for example. If the answer to the step S68 is affirmative (YES), it is determined at a step S69 whether a timer tmREF2 has a count value of 0. The timer tmREF2 is set to a predetermined time period tmREFIDL (e.g. 3 sec) and started at the step S91, to measure time elapsed after transition to the idling condition. If the answer is negative (NO), i.e. the predetermined time period tmREFIDL has not elapsed, the program is immediately terminated without carrying out calculation of the learned value. When the predetermined time period tmREFIDL has elapsed (the answer to the step S69 is affirmative or YES), the idling learned value KREFIDL is calculated at a step S70, followed by limit checking of the calculated value KREFIDL at a step S71 and then terminating the program.

By thus inhibiting the calculation of the idling learned value KREFIDL within a predetermined time period after transition into an idling condition, a deviation in the idling learned value KREFIDL can be avoided. More specifically, in the case where the engine is decelerated into an idling state, the engine undergoes an unstable condition, for example, the flow velocity of the mixture is high immediately after the transition into the idling state, fuel adhering to the inner wall of the intake pipe is drawn into the combustion chamber, and a misfire can occur, whereby accurate detection of the air-fuel ratio commensurate with the supply air-fuel ratio is impossible to carry out. Therefore, in this embodiment, calculation of the learned value is started upon the lapse of the predetermined time period after the transition into the idling state, to thereby enable to obtain a value of the air-fuel ratio correction coefficient based upon the detected air-fuel ratio obtained in a stable engine condition and hence prevent a deviation in the learned value.

At the step S70, the learned value KREF is calculated by the following equation (5):

$$KREF = \frac{CREF}{65536} \times KLAFI + \frac{65536 - CREF}{65536} \times KREF(N-1) \tag{5}$$

where CREF represents a variable which is set to an appropriate value dependent on engine operating conditions within a range of 1-65536, and KREF (N−1) an immediately preceding value of the learned value KREF.

According to the equation (5), the learned value KREF is calculated as an average value of the integral term KLAFI. Since the integral value KLAFI becomes almost equal to the value of the correction coefficient KLAF when calculated in a steady engine operating condition. Therefore, the learned value KREF calculated by the equation (5) can be substantially regarded as an average value of the KLAF value.

The limit checking at the step S71 is effected by comparing the calculated learned value with predetermined upper and lower limits, and setting the learned value to the upper limit or the lower limit if the calculated learned value falls outside the range defined by the upper and lower limits.

If the answer to the question of the steps S68 is negative (NO), i.e. if the engine is not idling, it is then determined whether the selected valve timing is the high speed valve timing, at a step S72. If the answer is negative (NO), i.e. the low speed valve timing is selected, it is determined whether the engine rotational speed NE is equal to or higher than a predetermined low value NREF2 (e.g. 500 rpm), at a step S80. If the answer is negative (NO), i.e. if NE<NREF2, the program jumps to the step S91 without effecting calculation of the learned value. If the answer to the step S80 is affirmative (YES), i.e. if NE≧NREF2, steps S81-S90 are executed to carry out calculation of the learned value (steps S82, S86, and S89) in each of three ranges (L1)-(L3) defined by the relationships between the desired air-fuel ratio coefficient KCMD and first to fourth predetermined air-fuel ratio values KCMDZL, KCMDZML, KCMDZMH, and KCMDZH (steps S82, S86, and S89), and limit checking is made of the calculated learned value (steps S83, S87, and S90), followed by the program proceeding to the step S91.

The first to fourth predetermined air-fuel ratio values KCMDZL, KCMDZML, DCMDZMH, and KCMDZH are set, respectively, to values corresponding to 20.0, 15.0, 14.3, and 13.0 in such a relationship that KCMDZL<KCMDZML<KCMDZMH<KCMDZH:

(L1) a range in which KCMD≦KCMDZL (the answer to the step S81 is negative or No):

A "lean-burn" learned value KREFL1 is calculated by the equation (5) when the low speed valve timing is selected and the desired air-fuel ratio is set to a learner value than the stoichiometric air-fuel ratio (this state corresponds to a state in which the LAF sensor output value VAF is equal or close to the value VAF2);

(L2) a range in which KCMDZML≦KCMD≦KCMDZMH (the answer to the step S81 is affirmative or YES, and at the same time the answers to the steps S84, S88 are both negative NO):

The first low speed valve timing learned value KREFL0 is calculated by the equation (5) when the low speed valve timing is selected and the desired air-fuel ratio is equal or close to the stoichiometric air-fuel ratio;

(L3) a range in which KCMD≧KCMDZH (the answers to the steps S81, S84 are both affirmative or YES and at the same the answer to the step S85 is negative or NO):

A second low valve timing learned value KREFL2 is calculated by the equation (5) when the low speed valve timing is selected and the desired air-fuel ratio is equal or close to a valve corresponding to the predetermined high load operating condition.

On the other hand, in a range in which KCMDZL<KCMD<KCMDZML (the answer to the step S88 is affirmative or YES) and in a range in which KCMDZMH<KCMD<KCMDZH (the answer to the step S85 is affirmative or YES), the program jumps to the step S91 without effecting calculation of the learned value.

If the step S91, the timer tmREF2 is set to the predetermined time period tmREFIDL and started, followed by terminating the program.

If the answer to the question of the step S72 is affirmative (YES), i.e. if the high speed valve timing is selected, steps S73–S79 are executed to carry out calculation of the learned value (steps S76, S78) in each of two ranges (H1) and (H2) defined by the relationships between the desired air-fuel ratio coefficient KCMD and the second to fourth predetermined air-fuel ratio values KCMDZML, KCMDZMH, and KCMDZH, and limit checking of the calculated learned value (steps S77, S79), followed by the program processing to step S91:

(H1) a range in which KCMDZML≦KCMD≦KCMDZMH (the answers to the steps S73, S74 are both negative or NO):

The first high speed valve timing learned value KREFH0 is calculated by the equation (5) when the high speed valve timing is selected and the desired air-fuel ratio is equal or close to the stoichiometric air-fuel ratio;

(H2) a range in which KCMD≧KCMDZH (the answer to the step S73 is affirmative or YES and at the same time the answer to the step S75 is negative or NO):

A second high speed valve timing learned value KREFH2 is calculated by the equation (5) when the high speed valve timing is selected and the desired air-fuel ratio is equal or close to the value corresponding to the predetermined high load operating condition.

On the other hand, in a range in which KCMD<KCMDZML (the answer to the step S74 is affirmative or YES) and in a range in which KCMDZMH<KCMD<KCMDZH (the answer to the step S75 is affirmative or YES), the program jumps to the step S91 without calculating the learned value.

Figure 9:
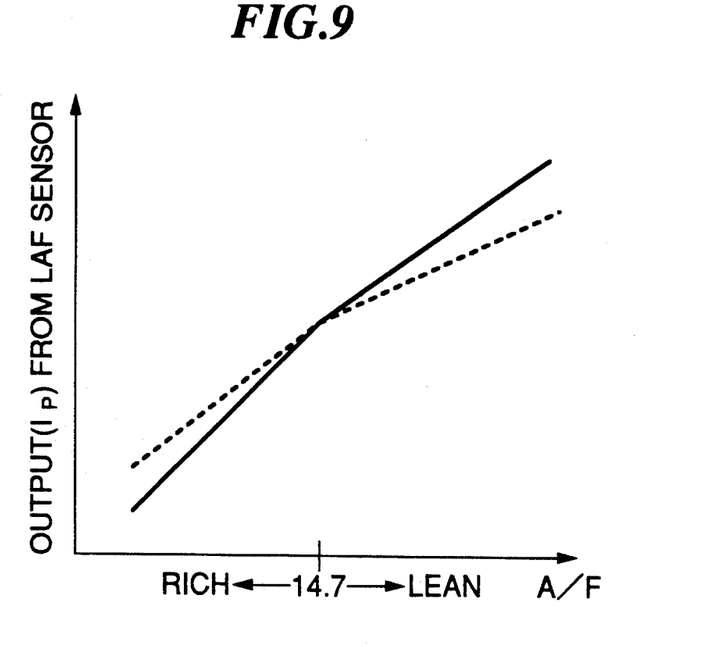
FIG. 9 is a graph showing the relationship between the air-fuel ratio (A/F) and the output value ($I_p$) of the LAF sensor.

As describe above, according to the program of FIGS. 6, 7 and 8, the learned value of the air-fuel ratio correction coefficient is calculated in each of cases where the desired air-fuel ratio is in the vicinity of the stoichiometric value, where the former is leaner than the latter, and where the former is richer than the latter. This takes into consideration aging of the LAF sensor 15. More specifically, the LAF sensor 15, when it is normally functioning, has an output characteristic depicted by the solid line in FIG. 9. However, if the output characteristic is deteriorated, as depicted by the broken line in the figure, the output value from the LAF sensor 15 is shifted in a decreasing direction when the desired air-fuel fuel ratio is learner than the stoichiometric value, and shifted in an increasing direction when the former is richer than the latter, while it remains unshifted when the former is in the vinicity of the latter. Therefore, by calculating the learned value of the air-fuel ratio correction coefficient in each of the regions determined according to the relationship between the desired air-fuel ratio and the stoichiometric air-fuel ratio, it is possible to properly control the supply air-fuel ratio.

Further, according to the above embodiment, the learned value of the air-fuel ratio correction coefficient is calculated correspondingly to each selected type of the valve timing, it is possible to obtain the learned value suitably corresponding to the selected valve timing.

Further, when the engine rotational speed is high (NE>NLAFH), the high speed valve timing is selected, so that the open loop control is performed by the use of the first high speed valve timing learned value KREFHO (step S20 in FIG. 2), while the fuel amount increase after the start of the engine is being performed or when the engine coolant temperature is low (TW≦TWLAF), the low speed valve timing is selected, so that the opening loop control is performed by the use of the first low speed valve timing learned value KREFLO (step S21 in FIG. 2). Therefore, it is possible to control the supply air-fuel ratio during the open loop control in a more suitable manner.

Further, in the above described embodiment, the learned value KREF is used by setting the air-fuel ratio correction coefficient KLAF to the learned value KREF (i.e. KLAF=KREF). However, the learned value KREF may be used by applying it to the fuel injection period TOUT according to the equation (6):

$$TOUT = Ti \times KCMDM \times KLAF \times KREF \times K1 + K2 \qquad (6).$$

Further, although, in the above described embodiment, the calculation of the average value KREF of the correction coefficient KLAF is inhibited when the absolute value of the difference between the desired valve opening value LCMD of the EGR valve 19 and the actual valve opening value LACT of same is larger than the predetermined value DLACTREF, the averaging rate of the average value may be decreased, instead of this, e.g. by setting the averaging variable CREF in the equation (5) to a smaller value CREF0 (CREF0<-

CREF1), as shown in FIG. 10, modifying part of the program of FIGS. 6 to 8.

What is claimed is:

1. In an air-fuel ratio control method for an internal combustion engine including an intake passage, an exhaust passage, an exhaust gas recirculation passage connecting between said intake passage and said exhaust passage, and exhaust gas recirculation control valve means arranged across said exhaust gas recirculation passage, and exhaust gas ingredient concentration sensor means arranged in said exhaust passage, wherein an amount of fuel supplied to said engine is calculated by the use of an air-fuel ratio correction coefficient set according to an output from said exhaust gas ingredient concentration sensor means, to thereby feedback-control the air-fuel ratio of an air-fuel mixture to a desired value in response to operating conditions of said engine, and an average value of said air-fuel ratio correction coefficient is calculated, the improvement comprising:

detecting an actual value of opening of said exhaust gas recirculation control valve means;

setting a desired value of said opening of said exhaust gas recirculation control valve means in response to operating conditions of said engine;

comparing said actual value of said opening of said exhaust gas recirculation control valve means with said desired value of said opening of said exhaust gas recirculation control valve means; and inhibiting the calculation of said average value of said air-fuel ratio correction coefficient when a difference between said actual value of said opening of said exhaust gas recirculation control valve means and said desired value of said opening of said exhaust gas recirculation control valve means is larger than a predetermined value.

2. In an air-fuel ratio control method for an internal combustion engine including an intake passage, an exhaust passage, an exhaust gas recirculation passage connecting between said intake passage and said exhaust passage, and exhaust gas recirculation control valve means arranged across said exhaust gas recirculation passage, and exhaust gas ingredient concentration sensor means arranged in said exhaust passage, wherein an amount of fuel supplied to said engine is calculated by the use of an air-fuel ratio correction coefficient set according to an output from said exhaust gas ingredient concentration sensor means, to thereby feedback-control the air-fuel ratio of an air-fuel mixture to a desired value in response to operating conditions of said engine, and an average value of said air-fuel ratio correction coefficient is calculated, the improvement comprising:

detecting an actual value of opening of said exhaust gas recirculation control valve means;

setting a desired value of said opening of said exhaust gas recirculation control valve means in response to operating conditions of said engine;

comparing said actual value of said opening of said exhaust gas recirculation control valve means with said desired value of said opening of said exhaust gas recirculation control valve means; and decreasing an averaging rate in the calculation of said average value of said air-fuel ratio correction coefficient when a difference between said actual value of said opening of said exhaust gas recirculation control valve means and said desired value of said opening of said exhaust gas recirculation control valve means is larger than a predetermined value.

3. An air-fuel ratio control method for an internal combustion engine according to claim 1 or 2, wherein said exhaust gas ingredient concentration sensor means has an output characteristic which is approximately proportional to concentration of an ingredient of exhaust gases in said exhaust passage.

4. An air-fuel ratio control method for an internal combustion engine according to claim 1 or 2, wherein said average value of said air-fuel ratio correction coefficient is used as an initial value of said air-fuel ratio correction coefficient when the feedback control of the air-fuel ratio is started.

5. An air-fuel ratio control method for an internal combustion engine according to claim 1 or 2, wherein said average value of said air-fuel ratio correction coefficient is used as an air-fuel ratio correction coefficient when the feedback control of the air-fuel ratio is inhibited.

6. An air-fuel ratio control method for an internal combustion engine according to claim 1 or 2, wherein said amount of fuel supplied to said engine is calculated by the use of said air-fuel ratio correction coefficient and said average value of said air-fuel ratio correction coefficient.

7. An air-fuel ratio control method for an internal combustion engine according to claim 1 or 2, wherein the calculation of said average value of said air-fuel ratio correction coefficient by using a normal averaging rate is started when a predetermined time period has elapsed after said difference between said actual value of said opening of said exhaust gas recirculation control valve means and said desired value of said opening of said exhaust gas recirculation control valve means has ceased to be larger than said predetermined value.

8. An air-fuel ratio control method for an internal combustion engine according to claim 1 or 2, wherein said engine includes intake valves and exhaust valves, and a valve timing changeover mechanism for changing at least one of a valve-opening time period, valve-opening timing, and a valve lift of said intake valves or said exhaust valves, said average value of said air-fuel ratio correction coefficient being separately calculated according to each of changeover modes of said valve timing changeover mechanism.

* * * * *